(12) United States Patent
Mukai et al.

(10) Patent No.: US 8,500,264 B2
(45) Date of Patent: *Aug. 6, 2013

(54) INK JET RECORDING METHOD

(75) Inventors: Hiroshi Mukai, Nagano-ken (JP);
Katsuko Aoki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 534 days.

This patent is subject to a terminal disclaimer.

(21) Appl. No.: 12/002,962

(22) Filed: Dec. 19, 2007

(65) Prior Publication Data

US 2008/0152877 A1    Jun. 26, 2008

(30) Foreign Application Priority Data

Dec. 25, 2006    (JP) .................................. 2006-348084

(51) Int. Cl.
*C09D 11/00*    (2006.01)

(52) U.S. Cl.
USPC ........................................................ 347/100

(58) Field of Classification Search
USPC ........................................................ 347/100
See application file for complete search history.

(56) References Cited

U.S. PATENT DOCUMENTS

| | | | |
|---|---|---|---|
| 5,981,623 A | 11/1999 | McCain et al. | |
| 6,087,416 A | 7/2000 | Pearlstine et al. | |
| 6,409,330 B1 | 6/2002 | Nakamura et al. | |
| 6,524,383 B2 | 2/2003 | Komatsu et al. | |
| 6,572,228 B2 * | 6/2003 | Kaga et al. | 347/102 |
| 6,900,253 B2 | 5/2005 | Takao et al. | |
| 7,731,789 B2 * | 6/2010 | Aoki et al. | 106/31.75 |
| 2002/0154182 A1 * | 10/2002 | Takahashi et al. | 347/12 |
| 2004/0024086 A1 | 2/2004 | Segawa et al. | |
| 2004/0239738 A1 * | 12/2004 | Watanabe | 347/100 |
| 2005/0176847 A1 | 8/2005 | Cagle | |
| 2008/0028980 A1 | 2/2008 | Aoki et al. | |

FOREIGN PATENT DOCUMENTS

| | | |
|---|---|---|
| EP | 0 974 626 A1 | 1/2000 |
| EP | 1 609 828 A1 | 12/2005 |
| JP | 62-001426 A | 1/1987 |
| JP | 03-056573 A | 3/1991 |
| JP | 03-079678 A | 4/1991 |
| JP | 03-160068 A | 7/1991 |
| JP | 04-018462 A | 1/1992 |
| JP | 10-279871 | 10/1998 |
| JP | 2000-044858 A | 2/2000 |
| JP | 2002-038061 A | 2/2002 |
| JP | 2003-206426 | 7/2003 |
| JP | 2003-306620 | 10/2003 |
| JP | 2004-114691 | 4/2004 |
| JP | 2004-176057 | 6/2004 |
| JP | 2004-250659 | 9/2004 |
| JP | 2005-048188 A | 2/2005 |
| JP | 2005194301 A | 7/2005 |
| JP | 2005-220352 | 8/2005 |
| JP | 2006-022328 | 1/2006 |
| JP | 2006-281533 | 10/2006 |
| JP | 2006-281538 | 10/2006 |
| JP | 2006-281568 | 10/2006 |
| JP | 2006-281570 | 10/2006 |
| JP | 2006-282810 | 10/2006 |
| JP | 2006-282822 | 10/2006 |
| JP | 2006-282823 | 10/2006 |
| JP | 2006282822 A * | 10/2006 |
| JP | 2007-154087 A | 6/2007 |
| WO | WO-00-04103 | 1/2000 |
| WO | WO-01-62862 | 8/2001 |

* cited by examiner

*Primary Examiner* — Laura Martin
(74) *Attorney, Agent, or Firm* — Nutter McClennen & Fish LLP; John J. Penny, Jr.; Lydia G. Olson

(57) ABSTRACT

A recording method for printing on a plastic film surface of a print medium by ejecting droplets of a water-based ink composition onto the plastic film surface includes applying a water-based ink composition on the plastic film surface, and heating the water-based ink composition on the plastic film surface to a temperature of 40° C. or more. The water-based ink composition contains a coloring agent, 0.1% to 1.5% by weight of a silicone surfactant, an acetylene glycol surfactant, a pyrrolidone derivative, a thermoplastic resin, and water.

14 Claims, No Drawings

INK JET RECORDING METHOD

BACKGROUND

1. Technical Field

The present invention relates to an ink jet recording method that prints enhanced-quality images on a plastic film surface of a print medium (for example, a so-called non-coated plastic medium) with a water-based ink particularly at a high duty of 50% or more, and specifically to an ink jet recording method that can prevent ink mottling and non-uniformity and color bleeding and allow the ink to be dried rapidly.

2. Related Art

In order to enhance the quality of images printed on plastic surfaces of print media, a verity of techniques have been proposed.

For example, JP-A-2004-114691 is intended to provide an ink jet ink exhibiting superior waterfastness, lightfastness and abrasion resistance, and superior adhesion to untreated non-absorbable base material made of, for example, a vinyl derivative, and discloses an ink jet printing method in which printing is performed on an ink jet recording element with a water-based ink jet ink composition containing a polymer latex containing at least one vinyl halide monomer with heating.

JP-A-2004-176057 is intended to provide a water-based ink jet ink composition suitably used for printing on hydrophobic surfaces, and discloses a water-based ink jet ink composition containing a water-based emulsion polymer, a pigment, and a water-soluble surfactant and having a glass transition temperature (Tg) of −40 to 150° C.

This ink composition is superior in adhesion and image quality, and this advantage is typically exhibited when the surface subjected to printing is heated before ejecting imaging droplets onto the surface.

JP-A-2004-250659 discloses a method for printing on a medium with an ink containing a thermosetting resin.

JP-A-2006-22328 discloses a method for printing an image on hydrophobic base material that includes: (a) ejecting a water-based ink jet ink composition containing (i) a water-based vehicle, (ii) self-dispersing pigment, (iii) a silicone-containing surfactant, and (iv) a polymer having a glass transition temperature (Tg) of −40 to 150° C. on a hydrophobic surface; and (b) drying the water-based ink jet ink composition, and that further includes heating the surface of the base material and/or the image on the surface before drying.

However, those techniques cited above do not improve the quality of printed images.

In addition, JP-A-10-279871 is intended to provide an ink composition that is not ejected in an improper direction and prevents the nozzle from being out of order, and that consequently produces a high quality print at a high resolution and a high speed, and to provide a method for printing with the ink composition. The ink composition includes 1,2-alkyl diol, a polyorganosiloxane wetting agent, and 2-pyrrolidone. However, this ink composition cannot be applied to plastic media not having ink absorbing layer.

SUMMARY

An advantage of some aspects of the invention is that it provides an ink jet recording method for printing on a plastic film surface of a print medium with a water-based ink, which can prevent ink mottling and non-uniformity and color bleeding particularly when printing is performed at a high duty of 50% or more, and which helps the ink dry rapidly.

According to an aspect of the invention, an ink jet recording method is provided for printing on a plastic film surface of a print medium by ejecting droplets of a water-based ink composition onto the plastic film surface. In the method, a water-based ink composition is applied onto the plastic film surface. The water-based ink composition contains a coloring agent, 0.1% to 1.5% by weight of a silicone surfactant, an acetylene glycol surfactant, a pyrrolidone derivative, a thermoplastic resin, and water. The water-based ink composition on the plastic film surface is heated to a temperature of 40° C. or more.

Preferably, the silicone surfactant is a polysiloxane compound, the acetylene glycol surfactant is 3,6-dimethyl-4-octyne-3,6-diol, and the pyrrolidone derivative is N-methylpyrrolidone.

Preferably, the weight ratio of the silicone surfactant content to the acetylene glycol surfactant content in the water-based ink composition is in the range of 1:100 to 15:10.

Preferably, the weight ratio of the acetylene glycol surfactant content to the thermoplastic resin content in the water-based ink composition is in the range of 1:3 to 5:3.

Preferably, the water-based ink composition contains 4.0% to 25.0% by weight of the pyrrolidone derivative.

The coloring agent may be a pigment dispersed in the water-based ink composition.

The water-based ink composition may further contain an organic solvent having a low surface tension.

The organic solvent can be diethylene glycol monobutyl ether or triethylene glycol monobutyl ether.

The water-based ink composition may further contain a wetting agent.

The heating is performed with a heater or a hot air dryer.

According to another aspect of the invention, a record including an image formed by the ink jet recording method is provided.

The invention provides an ink jet recording method for printing on a plastic film surface of a print medium with a water-based ink. The recording method can prevent ink mottling and non-uniformity and color bleeding particularly when printing is performed at a high duty of 50% or more, and helps the ink dry rapidly. The recording method produces a record including a high-quality image having a superior abrasion resistance.

DESCRIPTION OF EXEMPLARY EMBODIMENTS

The ink jet recording method of the invention will now be described with reference to an exemplary embodiment.

The ink jet recording method according to an embodiment of the invention performs printing on a plastic film surface of a print medium by ejecting droplets of a water-based ink composition onto the plastic film surface. The water-based ink composition contains a coloring agent, 0.1% to 1.5% by weight of a silicone surfactant, an acetylene glycol surfactant, a pyrrolidone derivative, a thermoplastic resin, and water. The water-based ink composition is applied onto the plastic film surface and is then heated to a temperature of 40° C. or more.

Such a method produces the above-describe effects. More specifically, the method of the embodiment can prevent ink mottling and color bleeding, which are liable to occur when printing is performed with a water-based ink at a high duty of 50% or more. Consequently, the method can produce a high-quality abrasion-resistant record, such as a vibrant-color print on a plastic medium.

Ink Jet Recording Method

The ink jet recording method of the embodiment performs printing on a plastic film surface of a print medium by ejecting droplets of a water-based ink composition to apply the ink composition on the plastic film surface, as described above, and is particularly effective when printing is performed at a high duty of 50% or more.

In the printing method of the embodiment, the water-based ink composition on the plastic film surface is heated to a temperature of 40° C. or more, as described above. Consequently, the water in the water-based ink composition on the print medium is vaporized to dry the water-based ink composition, so that the thermoplastic resin in the water-based ink composition forms a coating (resin coating).

The heating temperature is preferably in the range of 40 to 60° C. Heating at a temperature of more than 60° C. may soften or deform the plastic film of the print medium on which printing is performed and, thus, make it difficult to transport the print medium, depending on the material of the plastic film. The print medium may shrink after heating. Preferably, the upper limit of the heating temperature is 60° C.

Since the solvent in the water-based ink composition, including water, is vaporized by heating, the adhesion between the plastic film and the resulting resin coating can be enhanced. The heating can be performed by a conventional method with a common heater, such as an infrared heater or a hot air heater. In the embodiment, a heater or a hot air dryer is preferably used. Any heating condition except the heating temperature can be appropriately set according to the type of the thermoplastic resin in the water-based ink composition, as long as the resin can form a coating under heating. For example, the heating may be performed with a heater or a hot air dryer for one minute to one day (preferably 3 minutes to 18 hours).

Alternatively, the water-based ink composition is applied onto a print medium pre-heated and then transported to a printer, or the water-based ink composition may be heated simultaneously with applying the ink composition onto the print medium with a heater built in, for example, the platen (for supporting the print medium) of the printing portion of the printer. These techniques may be combined.

The print medium having a plastic film on which printing is performed may be a non-surface-treated plastic film for ink jet printing (for example, a plastic film not having an ink absorbing layer), a print medium made of a plastic film, print medium made of paper or other common material whose base material is coated with a plastic or bonded to a plastic film. The plastic is not particularly limited, and exemplary plastics include vinyl chloride, polyethylene terephthalate (PET), polycarbonate, polystyrene, and polyurethane.

Water-based Ink Composition

The water-based ink composition used in the recording method of the embodiment contains a coloring agent, 0.1% to 1.5% by weight of a silicone surfactant, an acetylene glycol surfactant, a pyrrolidone derivative, a thermoplastic resin, and water.

The content of the constituent for dissolving the plastic film of the print medium in the water-based ink composition is controlled according to, at least, the material and state of the plastic film, and, further, the condition under which the ink dries. Accordingly, the amount of ink to be applied may be appropriately adjusted according to the reproducibility of images.

The thermoplastic resin is normally dispersed in the water-based ink composition. In other words, the water-based ink composition preferably includes a specific amount of a silicone surfactant, an acetylene glycol surfactant, a pyrrolidone derivative, a disperse medium constituted of at least water acting as a main solvent, and the thermoplastic resin dispersed in the disperse medium (or thermoplastic resin dispersed with the coloring agent in the disperse medium if the thermoplastic resin serves as the dispersant of the coloring agent). Preferably, the coloring agent in the water-based ink composition is a pigment, and the pigment is dispersed in the water-based ink composition. Also, the water-based ink composition preferably further contains an organic solvent having a low surface tension. The water-based ink composition may further contain a wetting agent.

Silicone Surfactant

In the ink composition used in the embodiment, 0.1% to 1.5% by weight of a silicone surfactant is used relative to the entirety of the ink composition in order to spread the ink uniformly while preventing the ink mottling and non-uniformity or the ink bleeding on the print medium after printing.

The silicone surfactant is preferably a polysiloxane compound, such as polyether-modified organosiloxane.

The polyether-modified organosiloxane is expressed by the following formula (1):

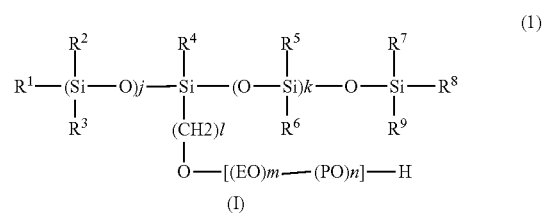

In the formula, $R^1$ to $R^9$ each represent an alkyl group having a carbon number in the range of 1 to 6; j and k each represent an integer of 1 or more; EO represents an ethyleneoxy group; PO represents a propyleneoxy group; and m and n each represent an integer of 0 or more. m+n represents an integer of 1 or more. EO's and PO's may form blocks or be randomly arranged irrespective of their order in the parentheses [ ].)

In particular, it is preferable that j+k makes an integer in the range of 11 to 300, more preferably in the range of 1 to 100, and particularly in the range of 11 to 50, from the viewpoint of preventing the ink mottling and non-uniformity resulting from the repellence of ink on the print medium.

Some of the compounds expressed by formula (1) are commercially available. For example, BYK-Chemie Japan offers silicone additives, such as BYK-306, BYK-307, BYK-333, BYK-341, BYK-345, BYK-346, and BYK-348.

The silicone surfactant content is in the range of 0.1% to 1.5% by weight, as described above, from the viewpoint of accomplishing the invention effectively.

Acetylene Glycol Surfactant

In order to prevent the ink mottling and the ink bleeding on the print medium after printing, an acetylene glycol surfactant is used in combination with the silicone surfactant.

The acetylene glycol surfactant is expressed by the following formula (2):

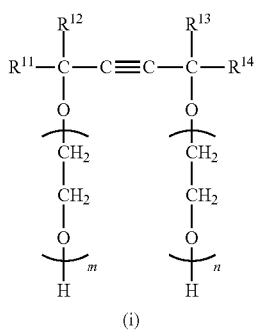

In formula (2), $R^{11}$, $R^{12}$, $R^{13}$, and $R^{14}$ each represent an alkyl group having a carbon number in the range of 1 to 6; and m and n are integers and the sum of them is in the range of 0 to 30.)

Examples of the acetylene glycol surfactant expressed by formula (2) include acetylene glycol surfactants, such as 2,4,7,9-tetramethyl-5-decyne-4,7-diol (for example, SURFYNOL 104 produced by Air Products and Chemicals, Inc.), 3,6-dimethyl-4-octyne-3,6-diol (for example, SURFYNOL 82 produced by Air Products and Chemicals, Inc.), and derivatives of such acetylene glycols (for example, SURFYNOLs 465 and 485 produced by Air Products and Chemicals, Inc.).

More specifically, exemplary acetylene glycol surfactants include 3,6-dimethyl-4-octyne-3,6-diol, 2,4,7,9-tetramethyl-5-decyne-4,7-diol, addition products produced by adding ethylene oxide or propylene oxide to those acetylene glycol surfactants. Among those, particularly preferred is 3,6-dimethyl-4-octyne-3,6-diol. This surfactant has a high solubility in water and, accordingly, its content in the ink is less limited. Also, it is solid at room temperature and, accordingly, the resulting print does not become sticky after the thermoplastic resin is cured.

The acetylene glycol surfactant content in the entirety of the ink composition is preferably in the range of 0.5% to 15.0% by weight, and more preferably in the range of 1.0% to 10.0% by weight.

The content ratio of the foregoing silicone surfactant to the acetylene glycol surfactant is preferably in the range of 1:100 to 15:10 on a weight basis, from the viewpoint of preventing the ink mottling and non-uniformity and the color bleeding.

Pyrrolidone Derivative

The water-based ink composition further contains a pyrrolidone derivative in view of the balance between how the ink is spread on the print medium with the silicone surfactant and the acetylene glycol surfactant after printing and how the below-described thermosetting resin is solidified.

Exemplary pyrrolidone derivatives include N-methylpyrrolidone, N-ethylpyrrolidone, N-vinylpyrrolidone, and 2-pyrrolidone. Among those preferred is N-methylpyrrolidone from the viewpoint of rapidly drying the ink and helping the thermoplastic resin form a coating.

The pyrrolidone derivative content in the entirety of the ink composition is preferably in the range of 2.0% to 25.0% by weight, and more preferably in the range of 4.0% to 25.0% by weight.

Thermoplastic Resin

In order to solidify the ink containing the less volatile silicone surfactant, the water-based ink composition contains a thermoplastic resin. The thermoplastic resin is dispersed in the water-based ink composition. The thermoplastic resin may be soluble or insoluble in the medium of the water-based ink composition. If the thermoplastic resin is soluble in the medium of the water-based ink composition, a resin dispersant for dispersing the pigment can be suitably used as the thermoplastic resin. If the thermosetting resin is insoluble in the medium of the water-based ink composition, the resin is preferably used in a form of emulsion, and the resin emulsion is added to the water-based ink composition. The resin emulsion is constituted of water, which is a continuous phase, and the thermoplastic resin, which is a dispersoid or disperse phase.

Preferably, the thermoplastic resin is a polymer having a hydrophilic portion and a hydrophobic portion. If the thermoplastic resin is used in a form of emulsion, the particle side of the resin is preferably, but not limited to, about 150 nm or less, and more preferably in the range of about 5 to 100 nm.

A resin dispersant or a resin component of resin emulsions, conventionally used in ink compositions for ink jet recording can be used as the thermoplastic resin. Examples of such a thermoplastic resin include acrylic polymers, such as polyacrylate and its copolymers, polymethacrylate and its copolymers, polyacrylonitrile and its copolymers, polycyanoacrylate, polyacrylamide, polyacrylic acid, and polymethacrylic acid; polyolefin polymers, such as polyethylene, polypropylene, polybutene, polyisobutylene, polystyrene and their copolymers, petroleum resin, coumarone-indene resin, and terpene resin; vinyl acetate or vinyl alcohol polymers, such as polyvinyl acetate and its copolymers, polyvinyl alcohol, polyvinyl acetal, and polyvinyl ethers; halogen-containing polymers, such as polyvinyl chloride and its copolymers, polyvinylidene chloride, fluorocarbon resin, and fluorocarbon rubber; nitrogen-containing vinyl polymers, such as polyvinylcarbazole, polyvinylpyrrolidone and its copolymers, polyvinylpyridine, and polyvinylimidazole; diene polymers, such as polybutadiene and its copolymers, polychloroprene, and polyisoprene (butyl rubber); and other ring-opened polymer resins, condensation polymer resins and natural macromolecular resins.

If the thermoplastic resin is used in a form of emulsion, the grains of the resin may be mixed in water with a surfactant in some cases. For example, an emulsion of an acrylic resin or a styrene-acrylate copolymer resin can be prepared by mixing a (meth)acrylate resin or a styrene-(meth)acrylate resin (and further, in a certain case, a (meth)acrylic acid resin) and a surfactant with water. In general, the mixing ratio of the resin component to the surfactant is preferably in the range of about 50:1 to 5:1. If the amount of surfactant is lower than this range, it is difficult to prepare an emulsion. If the amount of surfactant is higher than this range, the resulting ink is liable to be degraded in water resistance and adhesion.

Examples of the surfactant used in the resin emulsion preferably include, but not limited to, anion surfactants, such as sodium dodecylbenzenesulfonate, sodium lauryl sulfate, and polyoxyethylene alkyl ether sulfate ammonium salt; nonionic surfactants, such as polyoxyethylene alkyl ethers, polyoxyethylene alkyl esters, polyoxyethylene sorbitan fatty acid esters, polyoxyethylene alkylphenyl ethers, polyoxyethylene alkylamines, and polyoxyethylene alkylamides. These surfactants may be used singly or in combination.

The emulsion of the thermoplastic resin may be prepared by emulsion polymerization of a monomer of the above-listed resins in water containing a polymerization catalyst and an emulsifier. A polymerization initiator, the emulsifier, and a molecular weight-adjusting agent may be used in the emulsion polymerization according to a normal method.

Polymerization initiators used for normal radical polymerization can be used for the preparation of the resin emulsion. Examples of such a polymerization initiator include potassium persulfate, ammonium persulfate, hydrogen peroxide, azobisisobutyronitrile, benzoyl peroxide, dibutyl peroxide, peracetic acid, cumene hydroperoxide, t-butylhydroxyperoxide, and p-menthane hydroxyperoxide. If the polymerization is performed in water, a water-soluble polymerization initiator is suitable. Examples of the emulsifier include sodium lauryl sulfate, compounds generally uses as anionic surfactants, nonionic surfactants or amphoteric surfactants, and their mixtures. These emulsifiers may be used singly or in combination.

The proportion of the water in the resin emulsion is preferably in the range of 60 to 400 parts by weight, and more preferably in the range of 100 to 200 parts by weight, relative to 100 parts by weight of the thermoplastic resin or disperse phase.

If an emulsion is used as the thermoplastic resin, a known type can be used. For example, the resin emulsions disclosed in Japanese Examined Patent Application Publication No. 62-1426 and Japanese Unexamined Patent Application Publication Nos. 3-56573, 3-79678, 3-160068, and 4-18462 may be used as it is. Commercially available resin emulsions may be use, such as Microgels E-1002 and E-5002 (styrene-acrylic resin emulsions, produced by Nippon Paint), Boncoat 4001 (acrylic resin emulsion, produced by DIC Corporation), Boncoat 5454 (styrene-acrylic resin emulsion, produced by DIC Corporation), SAE 1014 (styrene-acrylic resin emulsion, produced by ZEON Corporation), and Saivinol SK-200 (acrylic resin emulsion, produced by Saiden Chemical Industry).

While the thermoplastic resin used in the embodiment may be in a form of fine-particle powder mixed with the other constituents of the water-based ink composition, the fine particle powder is preferably dispersed in water to prepare a resin emulsion and then the resin emulsion is mixed with the other constituents of the water-based ink composition.

The particle size of the thermoplastic resin is preferably in the range of 5 to 400 nm, and more preferably in the range of 50 to 200 nm, from the viewpoint of the long-term storage stability and ejection stability of the water-based ink composition.

Preferably, the water-based ink composition contains 0.1% to 15.0% by weight of, more preferably 0.5% to 10.0% by weight of, the thermoplastic resin, on a solid content basis. If the thermoplastic resin content in water-based ink composition is excessively low, the resin coating formed on the plastic film surface may become thin and, accordingly, the adhesion of the coating to the plastic film surface may be reduced. If the resin content is excessively high, the dispersion of the resin may become unstable during storage of the ink composition, or the resin may be flocculated even by a low vaporization of water, and consequently an uneven coating may be formed.

The thermoplastic resin content is preferably set so that the content ratio of the foregoing acetylene glycol surfactant to the thermoplastic resin is in the range of 1:3 to 5:3 on a weight basis, from the viewpoint of the adhesion to the plastic film.

Coloring Agent

The water-based ink composition of the embodiment contains a coloring agent. The coloring agent may be a dye or a pigment. In the embodiment, a pigment is preferably used.

The dye used as the coloring agent is not particularly limited, and may be an acid dye, a direct dye, a reactive dye, or a basic dye.

If a pigment is used as the coloring agent, any pigment can be selected for the water-based ink composition from the pigments conventionally used in water-based ink jet recording ink compositions. Such pigments include organic pigments and inorganic pigments. The pigment may be dispersed with a dispersant, such as a water-soluble resin or a surfactant, and is used in a form of dispersion. Alternatively, a surface-treated pigment prepared by introducing a hydrophilic group to the surface of the pigment may be dispersed or dissolved in an aqueous medium of the ink composition without using a dispersant. If the pigment is dispersed with a resin dispersant, a thermoplastic resin, which can be selected from the above-listed thermoplastic resins, may be used as the dispersant. The pigment may be a combination of at least two types of pigment.

Exemplary inorganic pigments include titanium oxide, iron oxide, and carbon black produced by a known process, such as a contact method, a furnace method, or a thermal method.

Exemplary organic pigments include azo pigments, such as azo lake, insoluble azo pigments, condensed azo pigments, and chelate azo pigments; polyclic pigments, such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates, such as basic dye chelates and acid dye chelates; nitro pigments, nitroso pigments, and aniline black. Preferably, a hydrophilic pigment is selected from those pigments.

More specifically, black ink pigments include carbon black (C. I. Pigment Black 7), such as furnace black, lampblack, acetylene black, or channel black; metal oxides, such as copper oxide, iron oxide (C. I. Pigment Black 11), and titanium oxide; and organic pigments, such as aniline black (C. I. Pigment Black 1).

Examples of preferred carbon blacks include carbon blacks produced by Mitsubishi Chemical, such as No. 2300, No. 900, MCF88, No. 20B, No. 33, No. 40, No. 45, No. 52, MA7, MA8, MA100, and No. 2200B; and carbon blacks produced by Degussa, such as Color Black FW1, FW2, FW2V, FW18, FW200, S150, S160 and S170, Pritex 35, U, V, and 140U, and Special Black 6, 5, 4A, 4 and 250; carbon blacks produced by Columbia Carbon, such as Conductex SC, and Raven 1255, 5750, 5250, 5000, 3500, 1255 and 700; and carbon blacks produced by Cabot, such as Regal 400R, 330R and 660R, Mogul L, Monarch 700, 800, 880, 900, 1000, 1100, 1300 and 1400, and Elftex 12.

Examples of preferred color ink pigments include C. I. Pigment Yellow 1 (Fast Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 138, 153 and 154; C. I. Pigment Red 1, 2, 3, 5, 17, 22 (brilliant first scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G lake), 83, 88, 92, 101 (colcothar), 104, 105, 106, 108 (cadmium red), 112, 114, 122 (quinacridone magenta), 123, 146, 149, 166, 168, 170, 172, 177, 178, 179, 185, 190, 193, 209 and 219; C. I. pigment violet 1 (rhodamine lake), 3, 5:1, 16, 19 (quinacridone red), 23 and 38; and C. I. Pigment Blue 1, 2, 15 (Phthalocyanine Blue R), 15:1, 15:2, 15:3 (Phthalocyanine Blue G), 15:4, 15:6 (phthalocyanine blue E), 16, 17:1, 56, 60 and 63.

The particle size of the pigment is not particularly limited, and the mean particle size is preferably 25 µm or less, and more preferably 1 µm or less. A pigment having a mean particle size of 25 µm or less can prevent clogging and, thus, lead to more sufficient ejection stability.

The pigment content in the entirety of the ink composition is preferably in the range of 0.5% to 15% by weight, and more preferably in the range of 1.0% to 10.0% by weight.

Organic Solvent Having Low Surface Tension

The water-based ink composition may contain an organic solvent having a low surface tension, if necessary. Such solvents include monohydric alcohols and polyhydric alcohol derivatives.

Among the monohydric alcohols preferred are monohydric alcohols having a carbon number in the range of 1 to 4, such as methanol, ethanol, n-propanol, i-propanol, and n-butanol.

Among the polyhydric alcohol derivatives preferred are partial and complete ethers of a dihydric to pentahydric alcohol having a carbon number in the range of 2 to 6 and a lower alcohol having a carbon number in the range of 1 to 4. The polyhydric alcohol derivative used herein is prepared by etherifying at least one hydroxy group of a polyhydric alcohol, and does not refer to the original polyhydric alcohol having no etherified hydroxy group. Preferably, the ether, or polyhydric alcohol lower alkyl ether, is expressed by general formula (3):

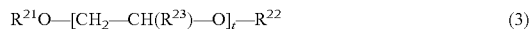

$$R^{21}O-[CH_2-CH(R^{23})-O]_t-R^{22} \quad (3)$$

In the formula, $R^{21}$ and $R^{22}$ each represent hydrogen or an alkyl group having a carbon number in the range of 3 to 6 (preferably butyl); $R^{23}$ represents hydrogen or a lower alkyl group having a carbon number in the range of 1 to 4, and preferably hydrogen, methyl, or ethyl; and t represents an integer in the range of 1 to 8, preferably in the range of 1 to 4. Also, at least one of $R^{21}$ and $R^{22}$ is an alkyl group having a carbon number in the range of 3 to 6 (preferably butyl).)

Exemplary polyhydric alcohol lower alkyl ethers include monoethylene glycol monoalkyl ether, diethylene glycol monoalkyl ether, triethylene glycol monoalkyl ether, monoethylene glycol dialkyl ether, diethylene glycol dialkyl ether, triethylene glycol dialkyl ether, monopropylene glycol monoalkyl ether, dipropylene glycol monoalkyl ether, tripropylene glycol monoalkyl ether, monopropylene glycol dialkyl ether, dipropylene glycol dialkyl ether, tripropylene glycol dialkyl ether. Among those preferred are triethylene glycol monobutyl ether, diethylene glycol monobutyl ether, diethylene glycol monopropyl ether, diethylene glycol monopentyl ether, and propylene glycol monobutyl ether.

The organic solvent having a low surface tension is preferably diethylene glycol monobutyl ether or triethylene glycol monobutyl ether.

The content of the organic solvent having a low surface tension in the entirety of the ink composition may be in the range of 0 to 10.0% by weight, and preferably in the range of 2.0% to 8.0% by weight.

The properties of the water-based ink composition can be appropriately controlled. In the present embodiment, the water-based ink composition preferably has a viscosity of 25 mPa·s or less, and more preferably 10 mPa·s or less (25° C.). Such a viscosity allows the water-based ink composition to be stably ejected from an ink ejection head. Also, the surface tension of the water-based ink composition may be set to, preferably, in the range of about 20.0 to 40.0 mN/m (25° C.), and more preferably in the range of about 25.0 to 35.0 mN/m.

Wetting Agent

The water-based ink composition may further contain a wetting agent in addition to the foregoing pyrrolidone derivative if necessary in view of the storage of the water-based ink composition and the ease of handling when the ink composition is applied. By adding a wetting agent, flocculation and solidification of the resin component, which are caused by water vaporization, can be prevented. Consequently, the clogging of the nozzles of the ink jet head during applying the ink can be prevented, and, thus, the ejection stability can be ensured.

Examples of the wetting agent include water-soluble polyhydric alcohols, particularly dihydric to pentahydric alcohols having a carbon number in the range of 2 to 10; nitrogen-containing hydrocarbon solvents, such as formamides, imidazolidinones, and amines; and sulfur-containing hydrocarbon solvents. These wetting agents may be used singly or in combination.

Exemplary water-soluble polyhydric alcohols include dihydric and trihydric alcohols having a carbon number in the range of 3 to 10, such as glycerin, ethylene glycol, diethylene glycol, triethylene glycol, dipropylene glycol, hexylene glycol, and 1,2,6-hexanetriol. These alcohols may be used singly or in combination.

The wetting agent content in the water-based ink composition is, for example, in the range of 0 to 20.0% by weight, and preferably in the range of 1.0% to 10.0% by weight. By setting the wetting agent content in such a range, the clogging of the nozzles can be prevented and, thus, the ejection stability can be ensured. An excessively high wetting agent content may cause the ink to dry and, thus, result in a failure.

Main Solvent

The water-based ink composition contains water as the main solvent, as described above. The water used in the ink composition may be ion-exchanged water, ultrafiltration water, reverse osmosis water, distilled water, or ultrapure water from the viewpoint of reducing ionic impurities as much as possible. The water is preferably sterilized by ultraviolet irradiation or hydrogen peroxide addition in order to prevent the occurrence of molds or bacteria for long-term storage of the ink composition.

Other Constituents

The above-described constituents of the water-based ink composition produce the effects desired in the embodiment. In addition to the constituents, the water-based ink composition may further contain other constituents as needed, such as a preservative, a fungicide, a pH adjuster, dissolving aid, an antioxidant, and a nozzle-clogging inhibitor.

Exemplary pH adjusters include potassium dihydrogen phosphate and disodium hydrogen phosphate. Exemplary preservatives or fungicides include sodium benzoate, sodium pentachlorophenol, sodium 2-pyridinethiol-1-oxide, sodium sorbate, sodium dehydroacetate, 1,2-dibenzothiazoline-3-one (such as Proxel CRL, Proxel BDN, Proxel GXL, Proxel XL-2, and Proxel TN, supplied from ICI). Exemplary dissolving aids or antioxidants include amines, such as diethanolamine, triethanolamine, propanolamine and morpholine, and their modified products; inorganic bases, such as potassium hydroxide, sodium hydroxide, and lithium hydroxide; ammonium hydroxide and quaternary ammonium hydroxides, such as tetramethylammonium hydroxide; carbonates, such as potassium carbonate, sodium carbonate, and lithium carbonate; phosphates; urea and its derivatives, such as N-methyl-2-pyrrolidone, thiourea, and tetramethylurea; allophanates, such as methyl allophanate; biuret and its derivatives, such as dimethyl biuret and tetramethyl biuret; L-ascorbic acid and its salts. In addition, in order to prevent the nozzles from drying, urea, thiourea, ethyleneurea, or the like may be added.

Preparation of Water-based Ink Composition

The water-based ink composition used in the embodiment can be prepared by mixing and dissolving or dispersing the above-described constituents in an arbitrary order and then, if necessary, filtrating the mixture to remove impurities. In this process, the pigment may be dispersed in a resin dispersant or a resin emulsion may be prepared, before mixing.

In a preferred water-based ink composition, the silicone surfactant is a polysiloxane compound; the acetylene glycol surfactant is 3,6-dimethyl-4-octyne-3,6-diol; and the pyrrolidone derivative is N-methylpyrrolidone. Such a water-based ink composition can be used for printing at a high duty of 50% or more and produce a high-quality print.

In another embodiment of the invention, a record is produced by the ink jet recording method of the embodiment.

The present invention will further described with reference to the following Examples and Experimental Examples. However, the invention is not limited to the Examples.

Ink Preparation

Ink compositions having Compositions 1 to 6 were prepared as follows:

TABLE 1

|  | Comp. 1 | Comp. 2 | Comp. 3 | Comp. 4 | Comp. 5 | Comp. 6 |
|---|---|---|---|---|---|---|
| Pigment | 4.0 | 4.0 | 4.0 | 4.0 | 4.0 | 4.0 |
| Pigment dispersant (Thermoplastic resin) | 2.0 | 2.0 | 2.0 | 2.0 | 2.0 | 2.0 |
| Thermoplastic resin emulsion | 4.0 | 4.0 | 4.0 | 4.0 | 4.0 | 4.0 |
| Silicone surfactant | 0.1 | 1.5 | 0.5 | 0.05 | 1.5 | 1.5 |
| Acetylene glycol surfactant | 10.0 | 1.0 | 5.0 | 10.0 | — | — |
| Triethylene glycol | — | — | — | — | — | 4.0 |
| N-methylpyrrolidone | 25.0 | 25.0 | 25.0 | 25.0 | 25.0 | 25.0 |
| Water | 54.9 | 62.5 | 59.5 | 55.0 | 63.5 | 59.5 |

(Unit of content: percent by weight)

The ink compositions having Compositions 1 to 3 were used in Examples 1 to 3 and Comparative Examples 4 to 6, respectively. In Examples 1 to 3, the ink composition was heated to a temperature of 40° C. or more according to the recording method of the invention. In Comparative Examples 4 to 6, a comparative recording method was performed in which the ink composition was heated to a temperature of less than 40° C. The ink compositions having Compositions 4 to 6 are used in the Comparative Examples 1 to 3 and Comparative Examples 7 to 9, respectively, to which the comparative recording method was applied.

The following pigments were added separately to the Compositions 1 to 6 to prepare cyan, magenta, yellow, and black ink compositions (four colors) for each of Compositions 1 to 6:

Cyan ink composition (C): C. I. Pigment Blue 15:3;
Magenta ink composition (M): C. I. Pigment Violet 19;
Yellow ink composition (Y): C. I. Pigment Yellow 74;
Black ink composition (K): C. I. Pigment Black 7; and
BYK-348 (product name, polyether-modified organosiloxane produced by BYK-Chemie Japan) was used as the silicone surfactant in each ink composition.

The pigment dispersant resin and the resin emulsion were as follows:

Thermoplastic resin dispersant for pigment: styrene-acrylic acid copolymer (molecular weight: 1000 to 10000, acid value: 100 to 300); and Thermoplastic resin emulsion: acrylic acid-acrylate copolymer (molecular weight: 1000 to 10000, glass transition temperature: 10 to 100° C.)

Printing 1

A cold laminate film PG-50L (PET medium) manufactured by Lami Corporation was used as the print medium having a plastic film surface on which printing is preformed. The print medium was set to the sheet feeder of an ink jet printer (PX-G900, manufactured by Seiko Epson) filled with the four color ink compositions prepared by adding the C, M, Y, and K pigments to any one of Compositions 1 to 6, and was heated to 70° C. with a dryer so that the temperature of the print medium was 45° C. during printing. Immediately after heating, a pattern having sets of two colors in contact with each other was printed on the print medium at a duty in the range of 40% to 100% designated in Tables 2 and 3 at a resolution of 1440 dpi in width by 1440 dpi in length.

The duty used herein refers to the percentage of the segments at which ink dots are put relative to all the segments, for example, relative to 2,073,600 segments defined by segmenting an area of 1 square inch into 1440 segments in the width direction and 1440 segments in the length direction for the resolution of 1440 dpi in width by 1440 dpi in length.

Evaluation of Prints

The resulting prints were evaluated for bleeding and mottling according to the following criteria. The results are shown in Tables 2 and 3.

1. Bleeding: It was observed at some duties whether or not bleeding occurred in the areas of the print pattern where two colors are in contact with each other. When no bleeding occurred, the print was marked with "good"; when bleeding was observed, it was marked with "bad". Then, evaluation was made according to the following criteria:

A: marked with "good" at duties up to 60%, capable of printing without bleeding at duties up to 60%;

B: marked with "good" at duties up to 50%, capable of printing without bleeding at duties up to 50%;

C: marked with "good" at duties up to 40%, capable of printing without bleeding at duties up to 40%; and D: marked with "bad" at duties of 50% or more, causing bleeding in printing at a duty of 40%.

2. Mottling: It was observed at some duties whether or not non-uniformity in density occurred in single-color solid areas. When no non-uniformity occurred, the print was marked with "good"; when non-uniformity was observed, it was marked with "bad". Then, evaluation was made according to the following criteria:

A: marked with "good" at duties up to 70%, capable of printing without mottling or non-uniformity at duties up to 70%;

B: marked with "good" at duties up to 60%, capable of printing without mottling or non-uniformity at duties up to 60%;

C: marked with "good" at duties up to 50%, capable of printing without mottling or non-uniformity at duties up to 50%; and D: marked with "bad" at duties of 50% or more, causing mottling and non-uniformity in printing at a duty of 50%.

TABLE 2

Bleeding Evaluation (print medium temperature: 45° C.)

| | | Acetylene glycol (%) | Silicone surfactant (%) | Triethylene glycol (%) | 40% | 50% | 60% | 70% | 80% | 90% | 100% | Evaluation |
|---|---|---|---|---|---|---|---|---|---|---|---|---|
| | | | | | \multicolumn{7}{c}{Printing duty} | |
| Example 1 | Comp. 1 | 10 | 0.1 | 0 | Good | Good | Good | Bad | Bad | Bad | Bad | A |
| Example 2 | Comp. 2 | 1 | 1.5 | 0 | Good | Good | Bad | Bad | Bad | Bad | Bad | B |
| Example 3 | Comp. 3 | 5 | 0.5 | 0 | Good | Good | Good | Bad | Bad | Bad | Bad | A |
| Comparative Example 1 | Comp. 4 | 10 | 0.05 | 0 | Good | Bad | Bad | Bad | Bad | Bad | Bad | C |
| Comparative Example 2 | Comp. 5 | 0 | 1.5 | 0 | Bad | Bad | Bad | Bad | Bad | Bad | Bad | D |
| Comparative Example 3 | Comp. 6 | 0 | 1.5 | 4 | Bad | Bad | Bad | Bad | Bad | Bad | Bad | D |

TABLE 3

Mottling Evaluation (print medium temperature: 45° C.)

| | | Acetylene glycol (%) | Silicone surfactant (%) | Triethylene glycol (%) | 40% | 50% | 60% | 70% | 80% | 90% | 100% | Evaluation |
|---|---|---|---|---|---|---|---|---|---|---|---|---|
| Example 1 | Comp. 1 | 10 | 0.1 | 0 | Good | Good | Good | Bad | Bad | Bad | Bad | B |
| Example 2 | Comp. 2 | 1 | 1.5 | 0 | Good | Good | Good | Bad | Bad | Bad | Bad | B |
| Example 3 | Comp. 3 | 5 | 0.5 | 0 | Good | Good | Good | Good | Bad | Bad | Bad | A |
| Comparative Example 1 | Comp. 4 | 10 | 0.05 | 0 | Good | Bad | Bad | Bad | Bad | Bad | Bad | D |
| Comparative Example 1 | Comp. 5 | 0 | 1.5 | 0 | Good | Bad | Bad | Bad | Bad | Bad | Bad | D |
| Comparative Example 1 | Comp. 6 | 0 | 1.5 | 4 | Good | Bad | Bad | Bad | Bad | Bad | Bad | D |

Printing 2 and Evaluation of Prints

A pattern having sets of two colors in contact with each other was printed on a print medium at a duty in the range of 40% to 100% designated in Tables 4 and 5 at a resolution of 1440 dpi in width by 1440 dpi in length in the same manner as in printing 1, except that the print medium set to the sheet feeder was heated to 60° C. with dryer so that the temperature of the print medium was 35° C. during printing. The resulting prints were subjected to the same evaluation as in printing 1. The results are shown in Tables 4 and 5.

TABLE 4

Bleeding Evaluation (print medium temperature: 35° C.)

| | | Acetylene glycol (%) | Silicone surfactant (%) | Triethylene glycol (%) | 40% | 50% | 60% | 70% | 80% | 90% | 100% | Evaluation |
|---|---|---|---|---|---|---|---|---|---|---|---|---|
| Comparative Example 4 | Comp. 1 | 10 | 0.1 | 0 | Good | Bad | Bad | Bad | Bad | Bad | Bad | C |
| Comparative Example 5 | Comp. 2 | 1 | 1.5 | 0 | Bad | Bad | Bad | Bad | Bad | Bad | Bad | D |
| Comparative Example 6 | Comp. 3 | 5 | 0.5 | 0 | Good | Bad | Bad | Bad | Bad | Bad | Bad | C |
| Comparative Example 7 | Comp. 4 | 10 | 0.05 | 0 | Good | Bad | Bad | Bad | Bad | Bad | Bad | C |
| Comparative Example 8 | Comp. 5 | 0 | 1.5 | 0 | Bad | Bad | Bad | Bad | Bad | Bad | Bad | D |
| Comparative Example 9 | Comp. 6 | 0 | 1.5 | 4 | Bad | Bad | Bad | Bad | Bad | Bad | Bad | D |

TABLE 5

| | | Acetylene glycol (%) | Silicone surfactant (%) | Triethylene glycol (5) | Printing duty | | | | | | | Evaluation |
|---|---|---|---|---|---|---|---|---|---|---|---|---|
| | | | | | 40% | 50% | 60% | 70% | 80% | 90% | 100% | |
| Comparative Example 4 | Comp. 1 | 10 | 0.1 | 0 | Good | Good | Good | Bad | Bad | Bad | Bad | B |
| Comparative Example 5 | Comp. 2 | 1 | 1.5 | 0 | Good | Good | Good | Bad | Bad | Bad | Bad | B |
| Comparative Example 6 | Comp. 3 | 5 | 0.5 | 0 | Good | Good | Good | Bad | Bad | Bad | Bad | B |
| Comparative Example 7 | Comp. 4 | 10 | 0.05 | 0 | Good | Bad | Bad | Bad | Bad | Bad | Bad | D |
| Comparative Example 8 | Comp. 5 | 0 | 1.5 | 0 | Good | Bad | Bad | Bad | Bad | Bad | Bad | D |
| Comparative Example 9 | Comp. 6 | 0 | 1.5 | 4 | Good | Bad | Bad | Bad | Bad | Bad | Bad | D |

Mottling Evaluation (print medium temperature: 35° C.)

What is claimed is:

1. A recording method for printing on a plastic film surface of a print medium by ejecting droplets of a water-based ink composition onto the plastic film surface, the method comprising:
    applying a water-based ink composition containing a coloring agent, 0.1% to 1.5% by weight of a silicone surfactant, an acetylene glycol surfactant, a thermoplastic resin, and water on the plastic film surface; and
    heating the water-based ink composition on the plastic film surface to a temperature of 40° C. or more, such that printing on the plastic film is performed at a duty of at least 40%.

2. The method according to claim 1, wherein the silicone surfactant is a polysiloxane compound and the acetylene glycol surfactant is 3,6-dimethyl-4-octyne-3,6-diol.

3. The method according to claim 1, wherein the weight ratio of the silicone surfactant content to the acetylene glycol surfactant content in the water-based ink composition is in the range of 1:100 to 15:10.

4. The method according to claim 1, wherein the weight ratio of the acetylene glycol surfactant content to the thermoplastic resin content in the water-based ink composition is in the range of 1:3 to 5:3.

5. The method according to claim 1, wherein the coloring agent is a pigment dispersed in the water-based ink composition.

6. The method according to claim 1, wherein the water-based ink composition further contains an organic solvent having a low surface tension.

7. The ink jet recording method according to claim 6, wherein the organic solvent is diethylene glycol monobutyl ether or triethylene glycol monobutyl ether.

8. The method according to claim 6, wherein said organic solvent is an alkyl ether of a polyhydric alcohol.

9. The method according to claim 1, wherein the water-based ink composition further contains a wetting agent.

10. The method according to claim 1, wherein the heating is performed with a heater or a hot air dryer.

11. A record comprising an image formed by the method according to claim 1.

12. The method according to claim 1, wherein the step of heating the water-based ink composition on the plastic film surface comprises the heating temperature in the range of 40° C. to 60° C.

13. A recording method for printing on a plastic film surface of a print medium by ejecting droplets of a water-based ink composition onto the plastic film surface, the method comprising:
    applying a water-based ink composition containing a coloring agent, 0.1% to 1.5% by weight of a silicone surfactant, an acetylene glycol surfactant, a thermoplastic resin, and water on the plastic film surface, and heating the water-based ink composition on the plastic film surface to a temperature of 40° C. or more
    wherein the weight ratio of the silicone surfactant content to the acetylene glycol surfactant content in the water-based ink composition is in the range of 1:100 to 15:10.

14. The method according to claim 13, wherein the water-based ink composition further contains an organic solvent which is an alkyl ether of a polyhydric alcohol.

* * * * *